US012088138B1

(12) United States Patent
Alsaif et al.

(10) Patent No.: US 12,088,138 B1
(45) Date of Patent: Sep. 10, 2024

(54) COMPENSATION DEVICE AND METHOD FOR DC GRIDS USING RENEWABLE ENERGY

(71) Applicant: KING SAUD UNIVERSITY, Riyadh (SA)

(72) Inventors: Faisal Khalid Alsaif, Riyadh (SA); Ahmed Khalid Allehyani, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/632,566

(22) Filed: Apr. 11, 2024

Related U.S. Application Data

(63) Continuation of application No. 18/378,324, filed on Oct. 10, 2023.

(51) Int. Cl.
 *H02J 7/34* (2006.01)
(52) U.S. Cl.
 CPC ............. *H02J 7/34* (2013.01); *H02J 2207/20* (2020.01); *H02J 2300/24* (2020.01); *H02J 2300/28* (2020.01)
(58) Field of Classification Search
 CPC ...... H02J 7/34; H02J 2300/28; H02J 2207/20; H02J 2300/24
 See application file for complete search history.

(56) References Cited

U.S. PATENT DOCUMENTS

| 7,333,349 B2 | 2/2008 | Chang et al. |
| 8,942,010 B2 | 1/2015 | Lee et al. |
| 9,728,970 B2 | 8/2017 | Li et al. |
| 2013/0076135 A1 | 3/2013 | Zhu et al. |
| 2020/0350820 A1 | 11/2020 | Grbovic et al. |

FOREIGN PATENT DOCUMENTS

| CN | 104779790 A | 7/2015 |
| CN | 104009633 B | 8/2016 |
| CN | 110071525 A | 7/2019 |
| CN | 216774617 U | 6/2022 |
| KR | 1020210109795 A | 9/2021 |
| TW | 202125967 A | 7/2021 |

OTHER PUBLICATIONS

Chang, Liuchen et al. "A Novel Buck-Boost Inverter for Photovoltaic Systems." Canadian Solar Buildings Conference Montreal, Aug. 20-24, 2004.
Kwasinski, A. et al. "Dynamic Behavior and Stabilization of DC Microgrids with Instantaneous Constant-Power Loads." IEEE Transactions on Power Electronics, vol. 26, No. 3, pp. 822-834, 2010.

*Primary Examiner* — Robert L Deberadinis
(74) *Attorney, Agent, or Firm* — Nath, Goldberg & Meyer; Joshua B. Goldberg (57) ABSTRACT

A DC compensation device having an integrated energy storage which allows it to store excess energy from a renewable energy source or supply its stored energy when the renewable energy source is not able to provide the expected energy. The device has three modes of operation. Normal operation delivers full current from the renewable energy source to the load. Series and parallel operations serve to improve the power quality of the grid.

9 Claims, 15 Drawing Sheets

COMPENSATION DEVICE AND METHOD FOR DC GRIDS USING RENEWABLE ENERGY

CROSS-REFERENCE TO RELATED APPLICATION

This application is a continuation of U.S. patent application Ser. No. 18/378,324, filed on Oct. 10, 2023, the entire contents of which are incorporated herein by reference.

BACKGROUND

1. Field

The present disclosure relates to improving DC networks by improving their power quality, and particularly to a compensation device and method for DC networks.

2. Description of the Related Art

Nowadays, the utilization of renewable energy such as wind and photovoltaic/solar (PV) is increasing more than ever. Also, Saudi Arabia's 2030 vision aims to achieve 58.7% power generation from renewable energy sources (RES). This means that dependency on traditional energy generation methods will be less than 43% when the vision is met.

The integration of such RES into the existing grid can lead to grid failure if not designed properly due to lack of power quality. In electrical engineering, compensation devices such as Flexible Alternating Current Transmission (FACTs)—for example, a Static VAR Compensator (SVC), Static Synchronous Compensator (STATCOM), Static Synchronous Series Compensator (SSSC) Unified Power Flow Controller (UPFC)—have helped with improving the quality of Alternating Current (AC) grids.

SUMMARY

The utilization of renewable energy sources such as photovoltaic (PV) will create Direct Current (DC) grids rather than Alternating Current (AC). The need for DC compensation devices to improve the power quality of such new grids is critical. These DC compensation devices can help both small grids and large DC grids. Small DC grids (microgrids) can represent data centers or electric vehicle (EV) applications. Larger DC grids can be either islanded by themselves or interconnected with AC grids. Hence, these DC compensation devices can be used in rural areas where the power generation is 100% dependent on RES such as PV or can be even installed in the new AC-DC-AC interconnection between the gulf countries that are being developed by the Gulf Cooperation Council Interconnection Authority (GCCIA).

The present device will have its own energy storage which allows it to store excess energy that is generated from the PV and can also help the grid by providing its own stored energy when the PV, for example, goes under cloud conditions and cannot provide the expected energy. The same functions can be achieved when the device is installed in the GCCIA's interconnected grid. There is no similar device currently used in DC networks.

A compensation device for DC grids, in one embodiment, includes: a first switch located between a first node and a second node; a second switch located between the first node and a third node; a voltage source located between the third node and a fourth node; a third switch located between the third node and a fifth node; a fourth switch located between the fifth node and the fourth node; and a fifth switch located between the fourth node and the second node.

In normal operation mode, the second switch and third switch are on, and the first switch, fourth switch, and fifth switch are off, allowing current to flow through the second switch and the third switch.

In series compensation mode, the second switch and fourth switch are on, and the first switch, third switch and fifth switch are off, allowing current to flow through the second switch, voltage source and the fourth switch.

In parallel compensation mode, the second switch, third switch and fifth switch are on, and the first switch and the fourth switch are off, allowing current to flow through the second switch, voltage source, third switch and fifth switch.

The compensation device for DC grids further includes: a micro gird having a first micro grid connection and a second micro grid connection, and a constant power load having a first constant power load connection and a second constant power load connection.

The first micro grid connection is connected to the first node through a first inductor. The second micro grid connection is connected to the second node.

The first constant power load connection is connected to the fifth node through a second inductor. The second constant power load connection is connected to the second node.

Another embodiment is a DC compensation method for a DC compensation device having a first switch located between a first node and a second node; a second switch located between the first node and a third node; a voltage source located between the third node and a fourth node; a third switch located between the third node and a fifth node; a fourth switch located between the fifth node and the fourth node; and a fifth switch located between the fourth node and the second node.

The DC compensation method includes: turning the second switch and the third switch on; and turning the first switch, fourth switch and fifth switch off, wherein in this normal compensation mode, current is allowed to flow through the second switch and the third switch.

The DC compensation method further includes: turning the second switch and fourth switch on; and turning the first switch, third switch and fifth switch off, wherein in this series compensation mode, current is allowed to flow through the second switch, voltage source and the fourth switch.

The DC compensation method further includes: turning the second switch, third switch and fifth switch on; and turning the first switch and the fourth switch off, wherein in this parallel compensation mode, current is allowed to flow through the second switch, voltage source, third switch and fifth switch.

The DC compensation method further includes: allowing current to flow through a micro gird having a first micro grid connection and a second micro grid connection, the first micro grid connection connected to the first node through a first inductor, and the second micro grid connection connected to the second node; and allowing current to flow through a constant power load having a first constant power load connection and a second constant power load connection, the first constant power load connection connected to the fifth node through a second inductor, and the second constant power load connection connected to the second node.

BRIEF DESCRIPTION OF THE DRAWINGS

Similar reference characters denote corresponding features consistently throughout the attached drawings.

DETAILED DESCRIPTION OF THE PREFERRED EMBODIMENTS

The increase in energy demands has resulted in an increase in environmental problems, such as greenhouse gases being emitted from non-renewable energy sources which can aid the global warming issue. As a result, the introduction of renewable energy sources (RES) has become the trend in the last decade due to the need to reduce these bad environmental consequences. Wind and photovoltaic (PV) are the major RES that science and research is focusing on lately. However, power generation and quality from such sources is prone to failure or does not provide high quality consistently, when compared to mature non-renewable traditional generation methods. Saudi Arabia's 2030 Vision aims to provide 58.7% of the electrical power demand from RES.

Improvements in power electronics have resulted in microgrids becoming a popular power distribution solution for plenty of applications. These applications include data centers, commercial buildings, electric vehicle charging stations, and vehicles on land, air or sea. Although the benefits of microgrids are broadly recognized, they can endure instability issues attributable to their loads' nature. Power converters that rigorously regulate their loads often behave as constant power loads (CPLs) on the DC bus. Microgrids with CPLs could become unstable when exposed to bus voltage or load power transients as a result of the CPLs' negative impedance characteristics. Bus voltage sags are the main concern in this work, which can be the result of fluctuation in the renewable energy source used such as photovoltaic (PV) or Wind. It's natural and normal to have such fluctuation in the generation using RES and can occur due to clouds passing over the PV panels or severe reduction in the wind speed for short period of time. However, such fluctuation can reduce the grid's power quality and eventually damage the load. One solution is to maintain the grid's power quality and operation under those uncontrollable transients (clouds covering the PV or the wind slowing down).

Hence, there is a need for a DC compensation device that improves power quality when utilizing renewable energy sources in an electrical network grid/microgrid. This device is a power electronics device that has integrated energy storage in it which allows it to store excess energy from the RES or help the grid by supplying its stored energy when the RES is not able to provide the expected energy. This DC compensation device is state-of-the-art, in the electrical engineering field, and can immensely improve the quality of future grids that utilize or depend on RES.

The DC compensation device provides compensation for the fluctuating energy amounts provided from a renewable energy source such as a wind power or photovoltaic energy source. More specifically, the DC compensation device is a power electronics device having an integrated energy storage which allows it to store excess energy from a renewable energy source or supply its stored energy when the renewable energy source is not able to provide the expected energy. The device has three modes of operation. Normal operation delivers full current from the renewable energy source to the load. Series and parallel operations serve to improve the power quality of the grid.

Figure 1:
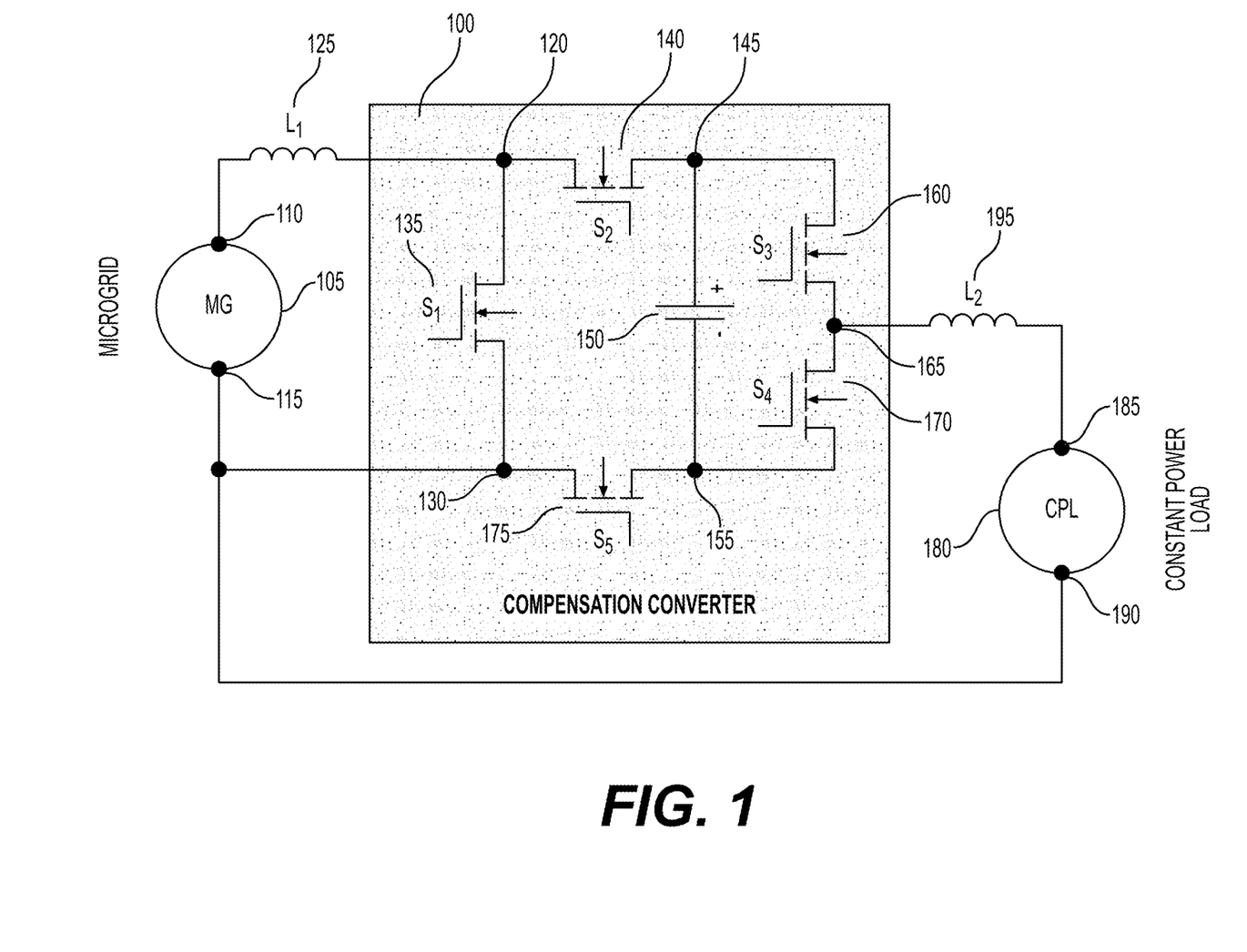
FIG. 1 is an illustration of a DC compensation converter.

FIG. 1 is an illustration of a DC compensation converter 100. A microgrid 105 includes a first micorgrid terminal 110 and a second microgrid terminal 115. The first microgrid terminal 110 is connected to a first node 120 through a first inductor 125. The second microgrid terminal 115 is connected to a second node 130.

The DC compensation converter 100 includes a first switch 135 located between the first node 120 and the second node 130. A second switch 140 is located between the first node 120 and the third node 145.

A voltage source 150 is located between the third node 145 and a fourth node 155. A third switch 160 is located between the third node 145 and a fifth node 165. A fourth switch 170 is located between the fifth node 165 and the fourth node 155; and a fifth switch 175 located between the fourth node 155 and the second node 130.

A constant power load 180 includes a first constant power load terminal 185 and a second constant power load terminal 190.

The first constant power load terminal 185 is connected to the fifth node 165 through a second inductor 195. The second constant power load terminal 190 is connected to the second node 130.

Figure 2:
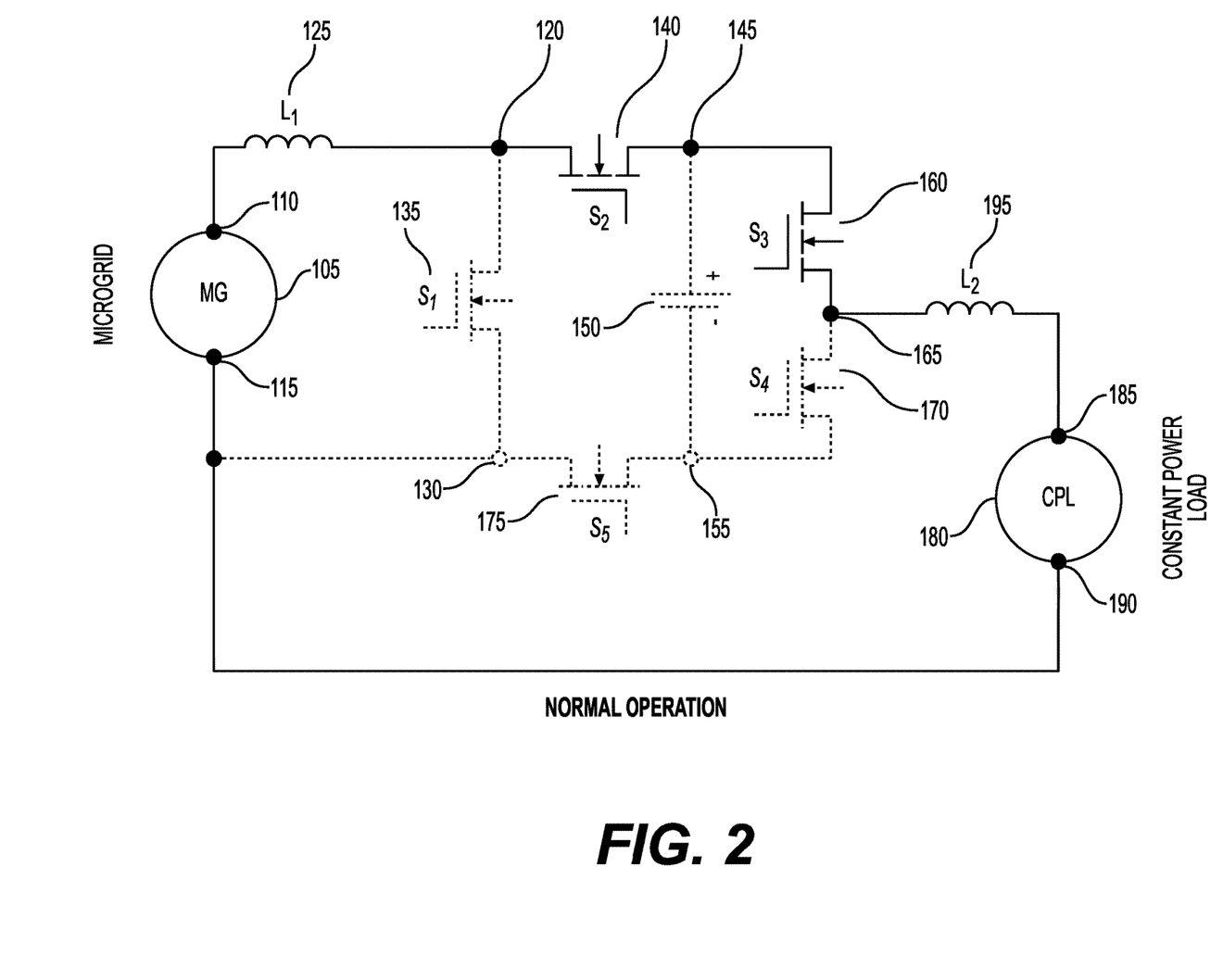
FIG. 2 is an illustration of a DC compensation converter in normal operation mode.

FIG. 2 is an illustration of the DC compensation converter 100 in normal operation mode. The second switch 140 and third switch 160 are on, and the first switch 135, fourth switch 170, and fifth switch 175 are off, allowing current to flow through the second switch 140 and the third switch 160.

Figure 3:
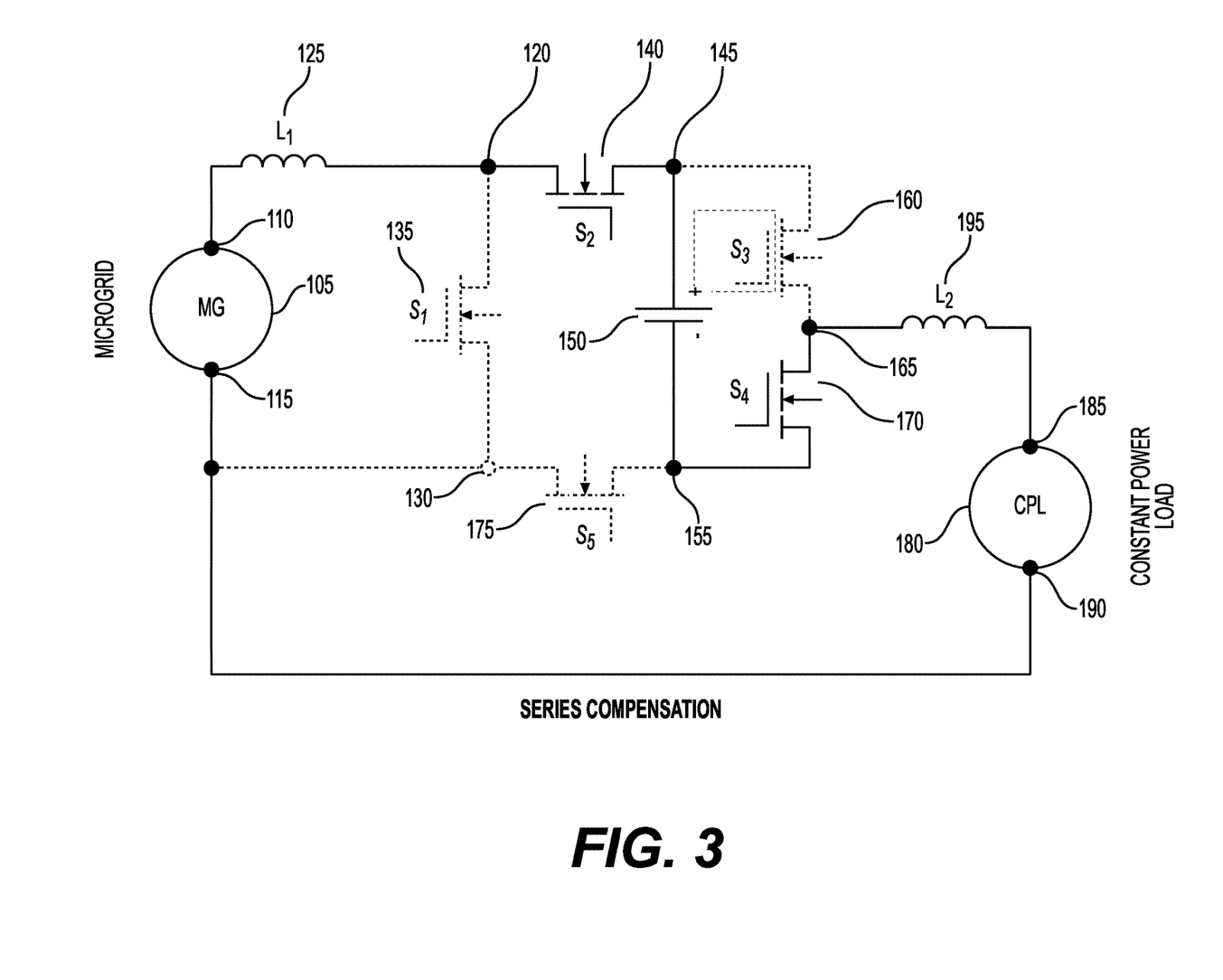
FIG. 3 is an illustration of a DC compensation converter in series compensation mode.

FIG. 3 is an illustration of the DC compensation converter 100 in series compensation mode. The second switch 140 and fourth switch 170 are on, and the first switch 135, third switch 160 and fifth switch 175 are off, allowing current to flow through the second switch 140, voltage source 150 and the fourth switch 170.

Figure 4:
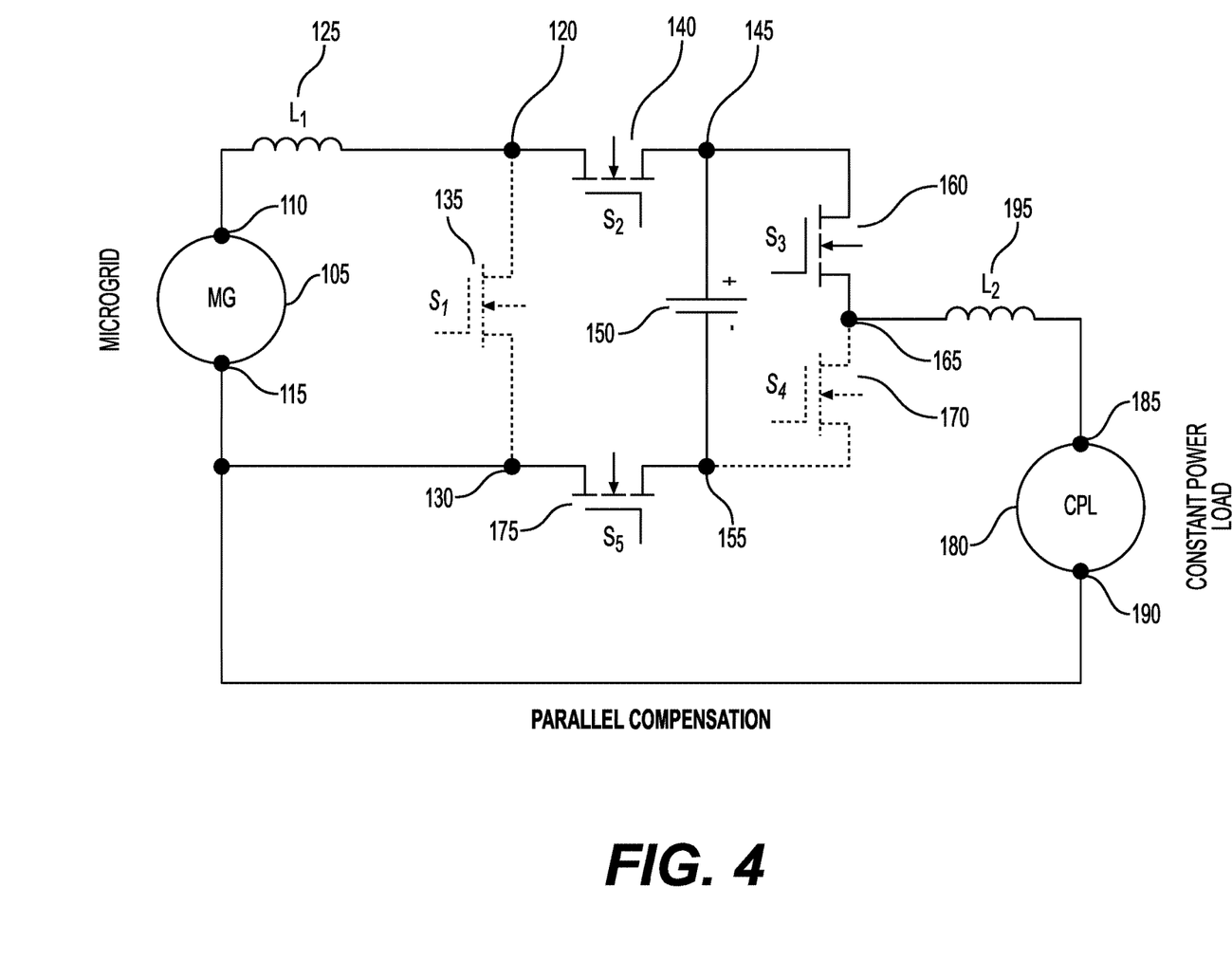
FIG. 4 is an illustration of a DC compensation converter in parallel compensation mode.

FIG. 4 is an illustration of the DC compensation converter 100 in parallel compensation mode. The second switch 140, third switch 160 and fifth switch 175 are on, and the first switch 135 and the fourth switch 170 are off, allowing current to flow through the second switch 140, voltage source 150, third switch 160 and fifth switch 175.

The DC compensation converter 100 has three operation modes. Normal operation mode delivers full current from source to load (FIG. 2), while series (FIG. 3) and parallel (FIG. 4) compensation modes help to improve the power quality of the grid. Finally, the energy storage (battery), voltage source 150, will interface with the RES (PV).

Figure 5:
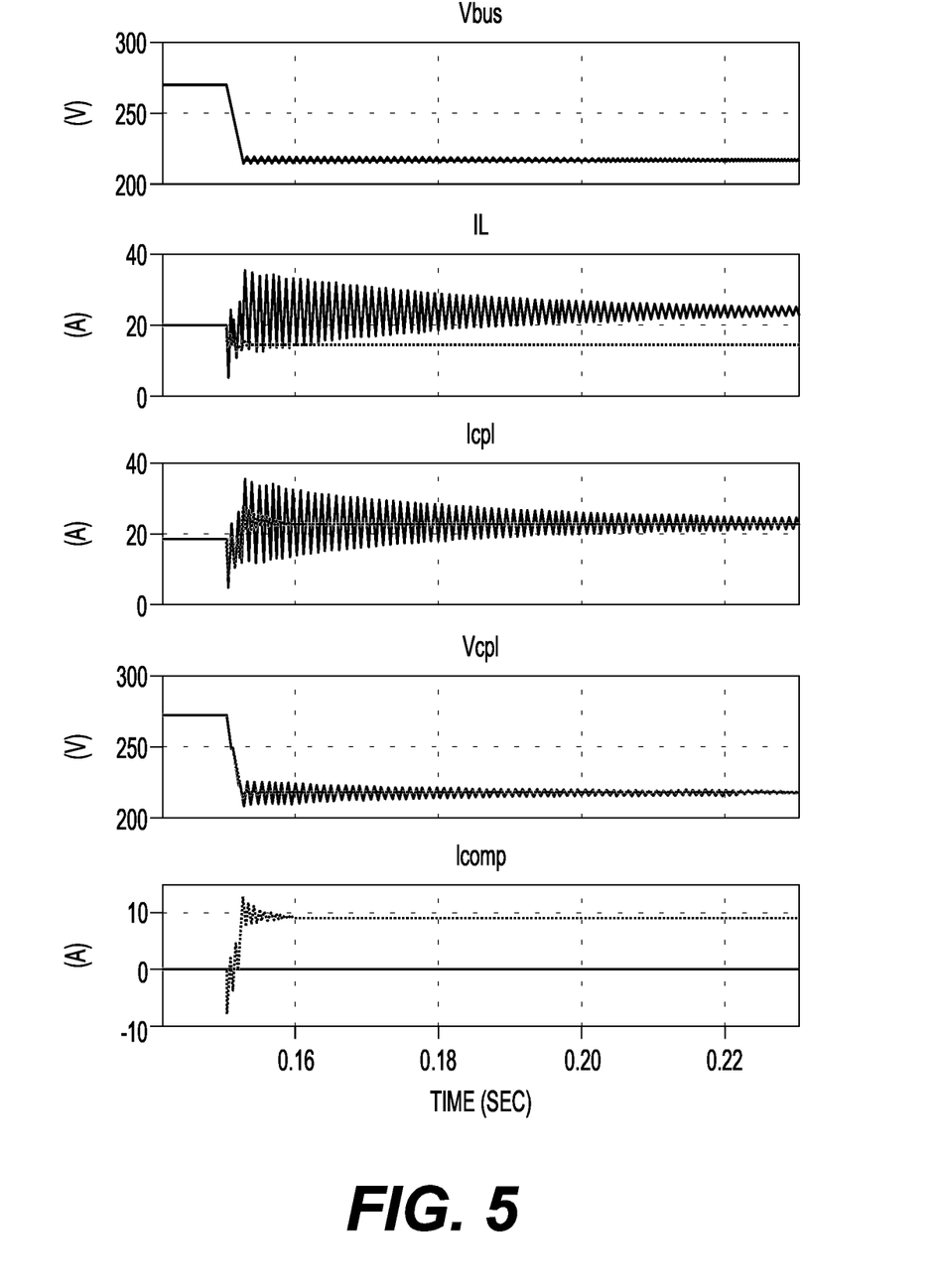
FIG. 5 shows a voltage sag response with and without compensation when the bus voltage has a 20% voltage sag emulating the influence of a cloud passing over PV panels.
Figure 6:
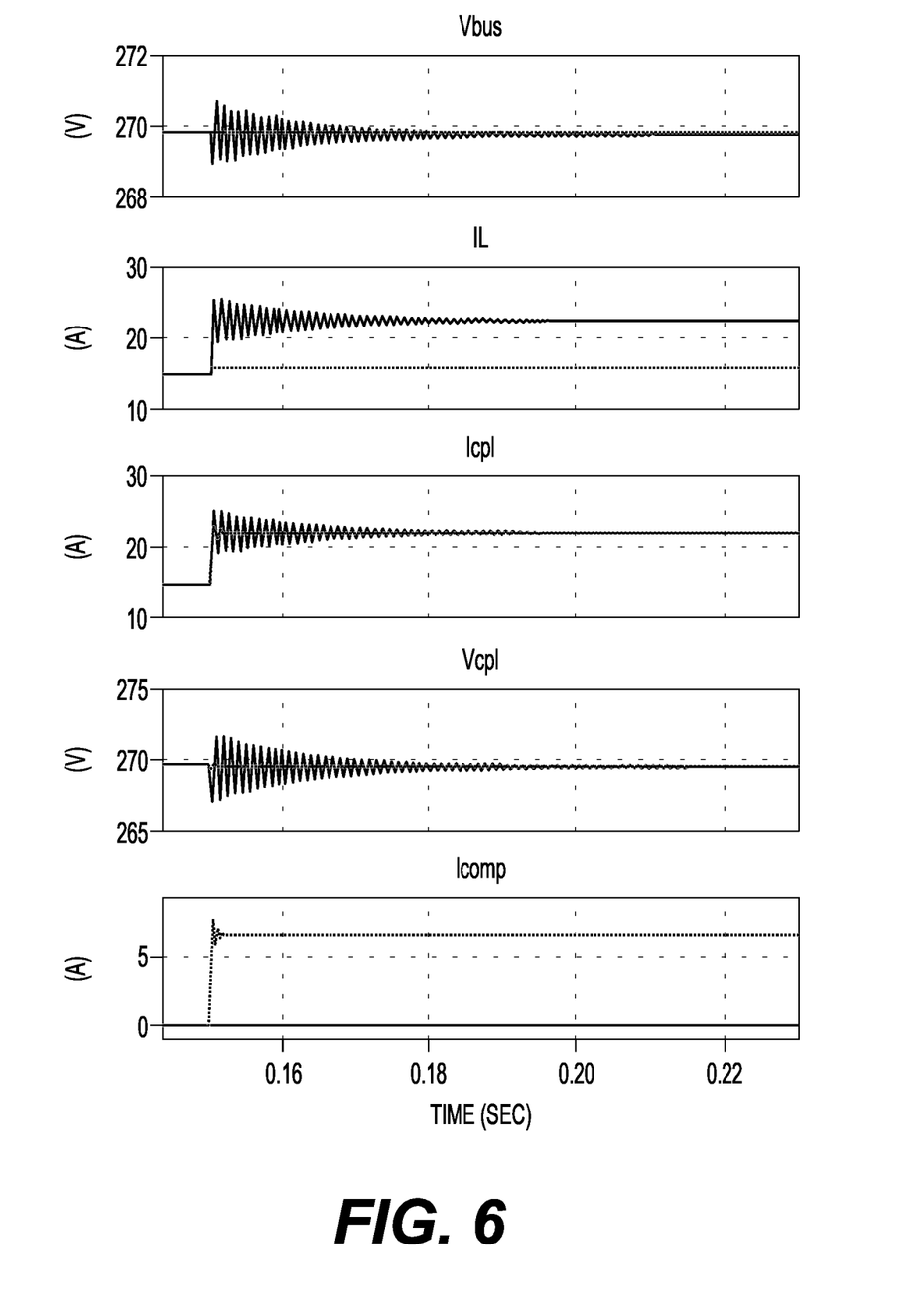
FIG. 6 shows a load step response with and without compensation when an additional 50% load is suddenly connected.

It can be seen that the DC compensation converter 100 utilizes a limited number of switches and passive (inductors, capacitors) elements. Hence, cost reduction and simple control can be achieved. The simulation results, shown in FIGS. 5 and 6, are briefly presented below to show the improvement in the system thanks to the DC compensation converter 100. Two scenarios are considered.

FIG. 5 shows a voltage sag response with and without compensation when the bus voltage has a 20% voltage sag emulating the influence of a cloud passing over the PV panels. The DC compensation converter 100 will use its energy storage to compensate for the resulting voltage sag.

FIG. 6 shows a load step response with and without compensation when an additional 50% load is suddenly connected. The DC compensation coverter, as shown in FIG. 6, shows its ability to provide the extra current.

From both scenarios, it can be seen that the device has significantly improved the power quality of the system by acting as a compensator for both voltage and current. Power quality improvement is referred to as ripple reduction. Furthermore, in the voltage compensation case, it shows how the load voltage was maintained despite the bus voltage sag caused by the cloud.

Figure 7:
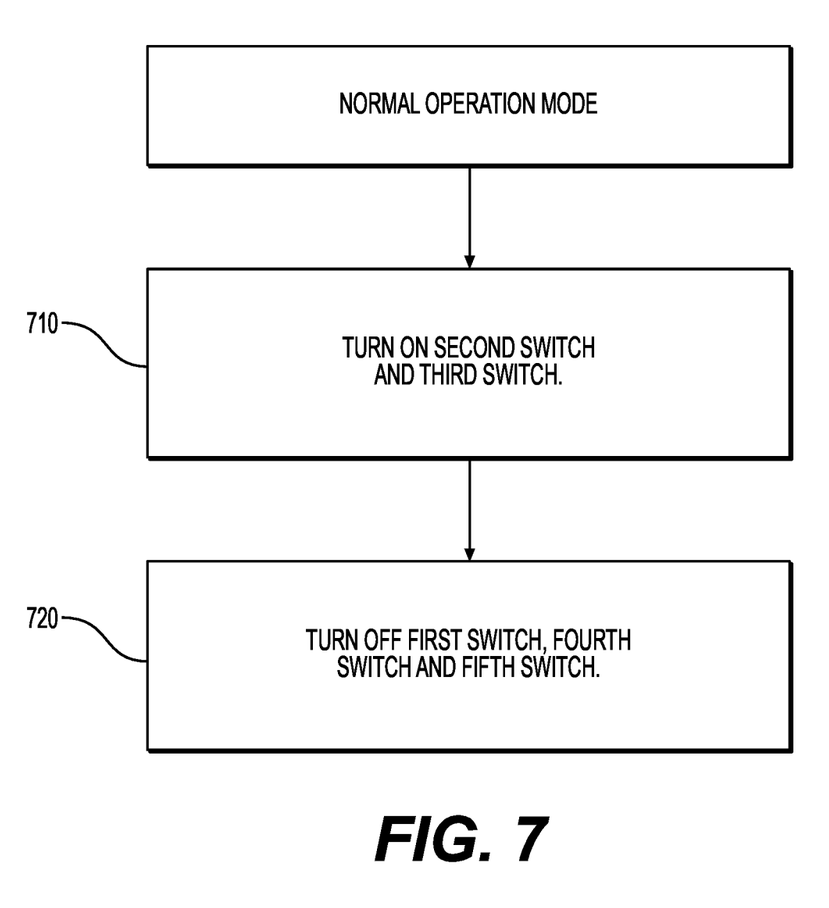
FIG. 7 is a flow diagram of a DC compensation method for a DC compensation device in normal operation mode.

FIG. 7 is a flow diagram of a DC compensation method for a DC compensation device, as illustrated in FIG. 1. In normal operation mode, the second switch 140 and the third switch 160 are turned on in box 710. The first switch 135, fourth switch 170 and fifth switch 175 are turned off in box 720. This allows current to flow through the second switch 140 and third switch 160 in this normal operation mode. Full current is delivered from source to load in this mode.

Figure 8:
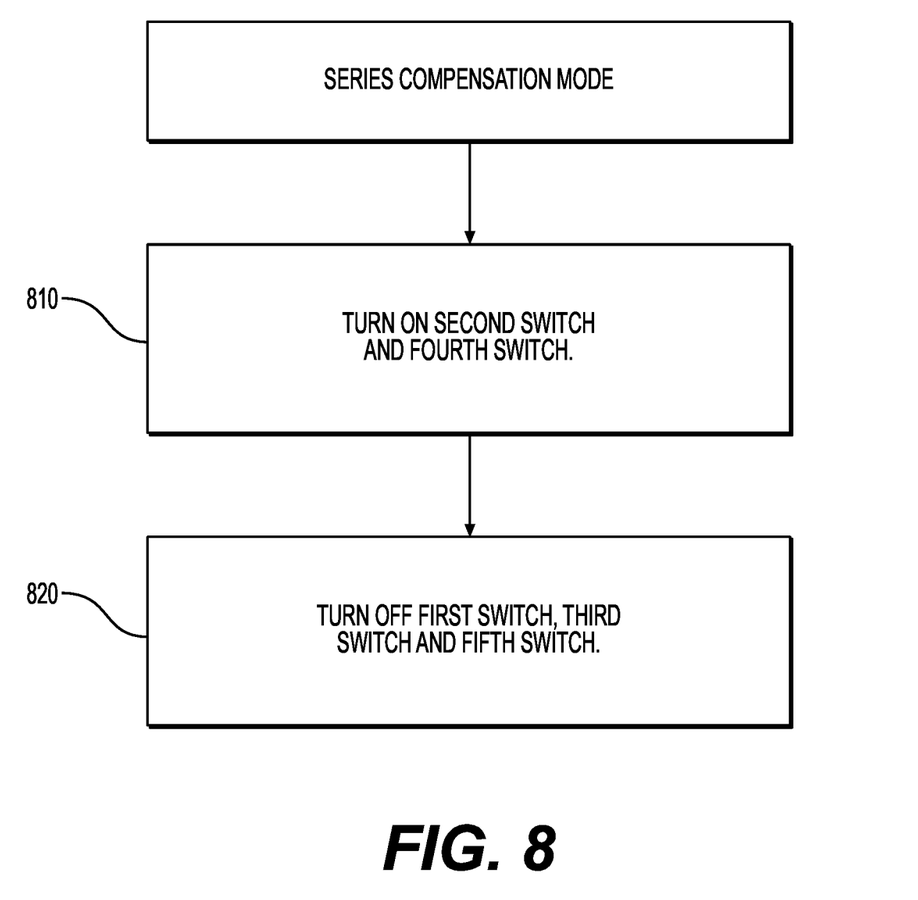
FIG. 8 is a flow diagram of a DC compensation method for a DC compensation device in series compensation mode.

FIG. 8 is a flow diagram of a DC compensation method for a DC compensation device, as illustrated in FIG. 1. In series compensation mode, the second switch 140 and fourth switch 170 are turned on in box 810. The first switch 135, third switch 160 and fifth switch 175 are turned off in box 820. This allows current to flow through the second switch 140, voltage source 150 and the fourth switch 170. The power quality of the grid is improved in this mode, and the energy storage (battery), voltage source 150, will interface with the RES (PV).

Figure 9:
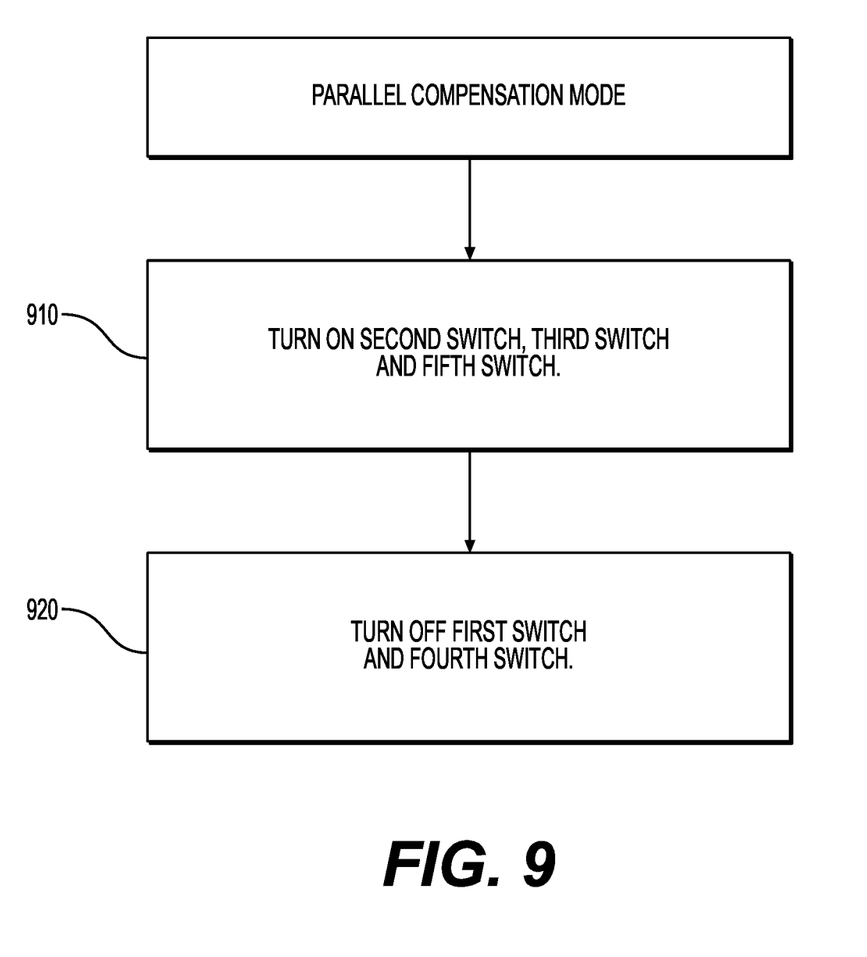
FIG. 9 is a flow diagram of a DC compensation method for a DC compensation device in parallel compensation mode.

FIG. 9 is a flow diagram of a DC compensation method for a DC compensation device, as illustrated in FIG. 1. In parallel compensation mode, the second switch 140, third switch 160 and fifth switch 175 are turned on in box 910. The first switch 135 and the fourth switch 170 are turned off in box 920. This allows current to flow through the second switch 140, voltage source 150, third switch 160 and the fifth switch 175. The power quality of the grid is improved in this mode, and the energy storage (battery), voltage source 150, will interface with the RES (PV).

The DC compensation method further includes allowing current to flow through a micro grid 105 having a first micro grid connection 110 and a second micro grid connection 115, the first micro grid connection 110 connected to the first node 120 through a first inductor 125, and the second micro grid connection 130 connected to the second node 135. Current is also allowed to flow through a constant power load 180 having a first constant power load connection 185 and a second constant power load connection 190.

The first constant power load connection 185 is connected to the fifth node 165 through a second inductor 195. The second constant power load connection 190 is connected to the second node 130.

Figure 10A:
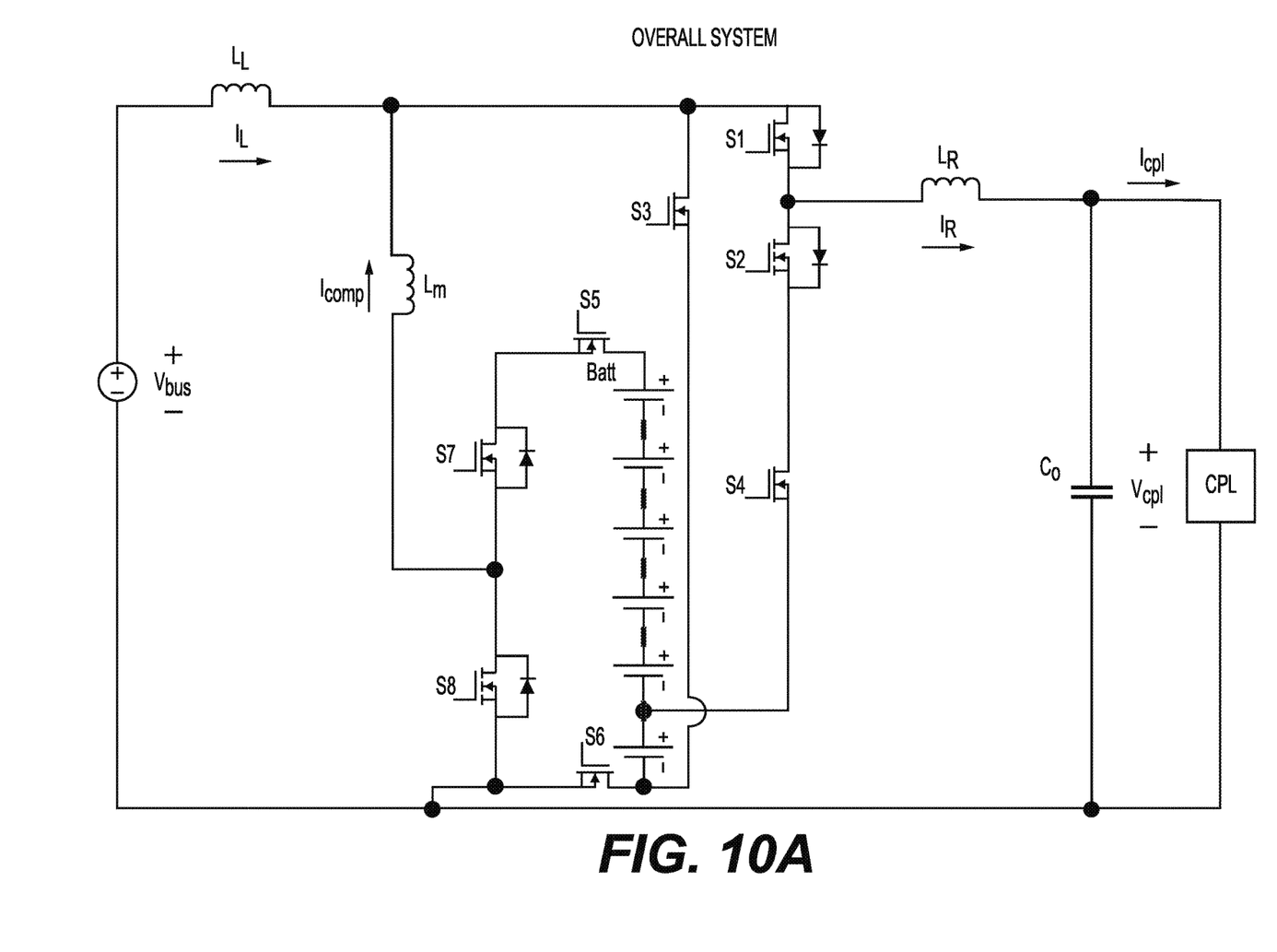
FIG. 10A is an illustration of another embodiment of a DC compensation converter.
Figure 10B:
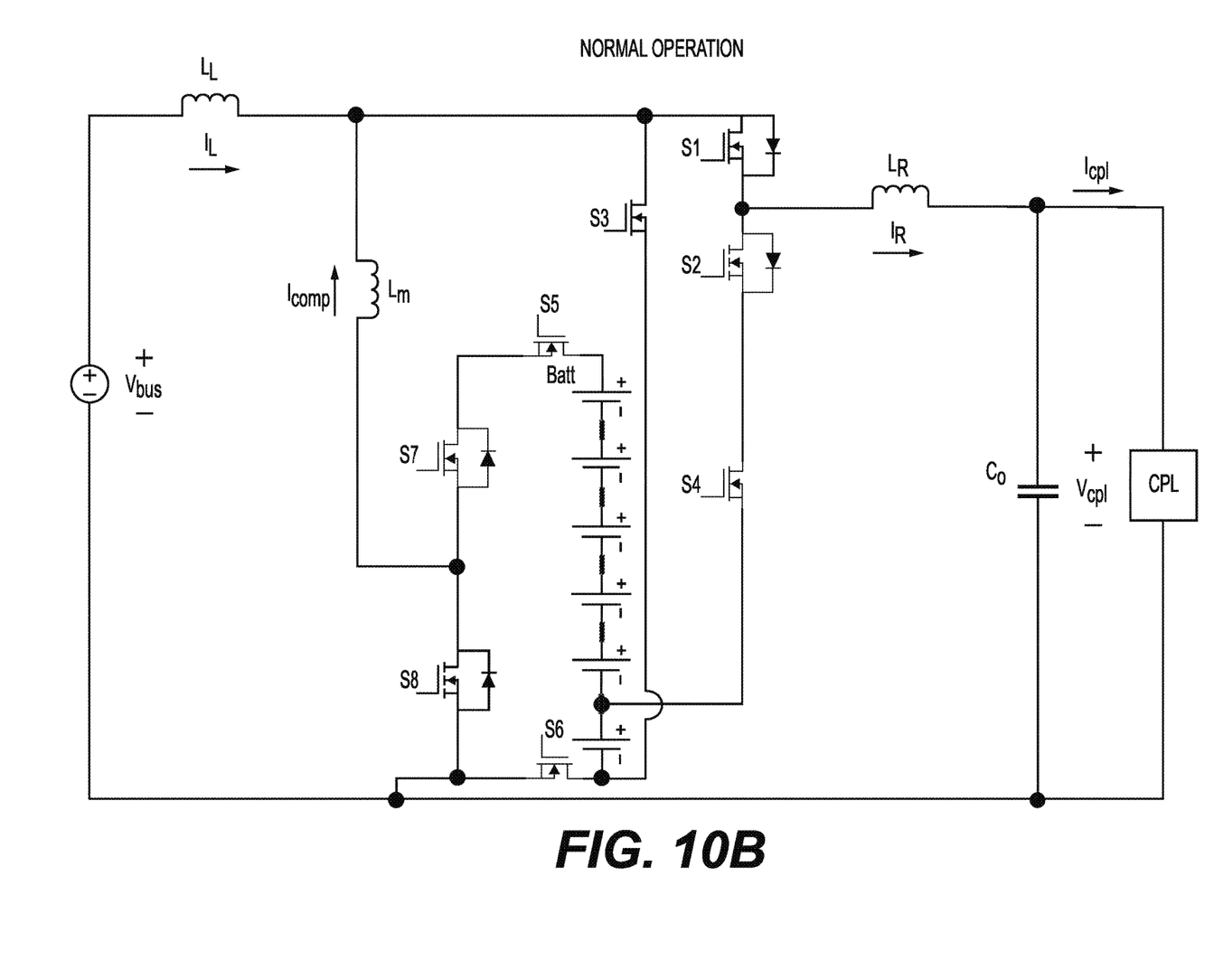
FIG. 10B is an illustration of the DC compensation converter in normal operation.

FIG. 10A is an illustration of another embodiment of a DC compensation converter. FIG. 10B is an illustration of the DC compensation converter in normal operation where switches S1, S3 and S8 are turned on.

Figure 11A:
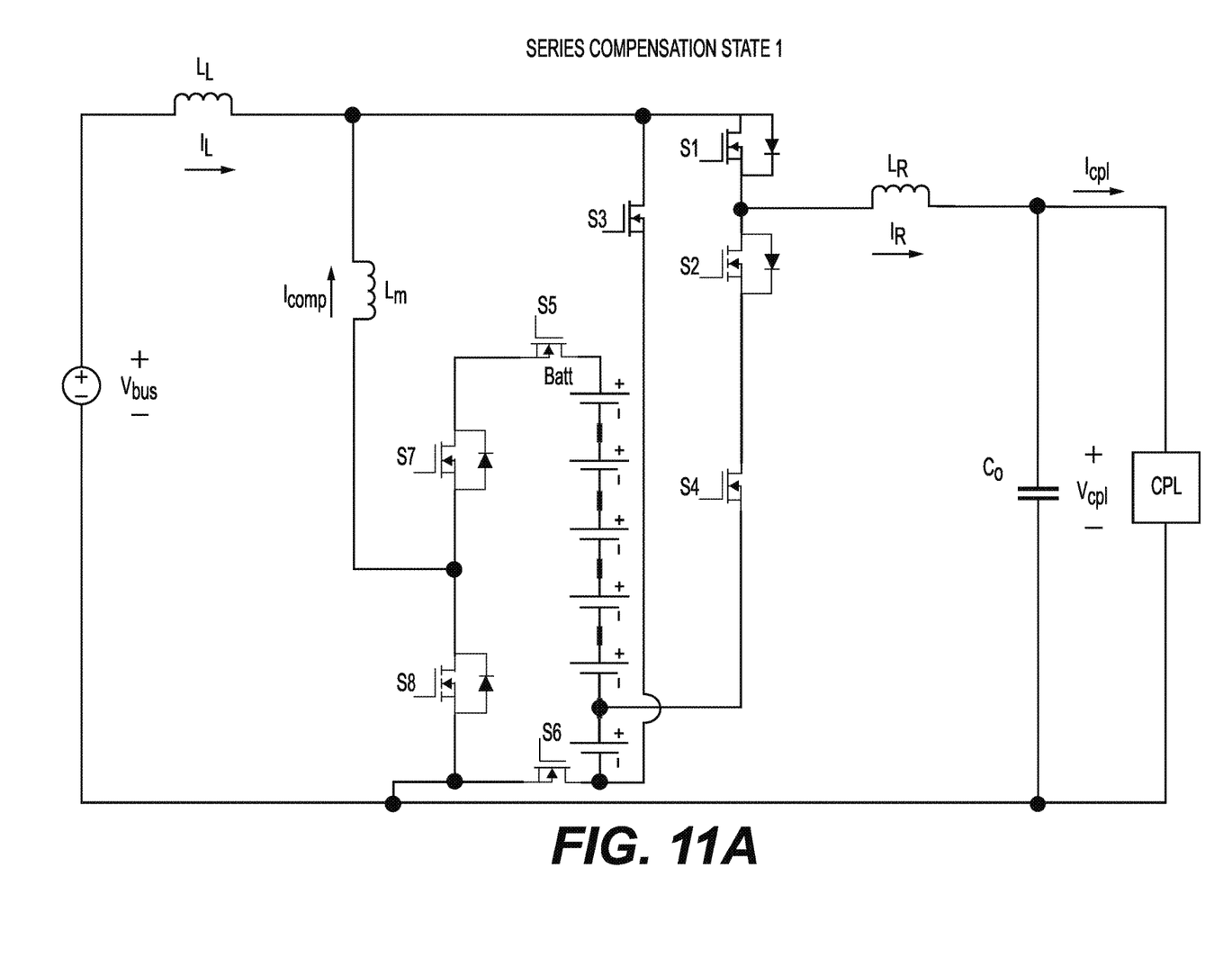
FIGS. 11A and 11B are illustration of the DC compensation converter of FIG. 10A in series compensation mode.
Figure 11B:
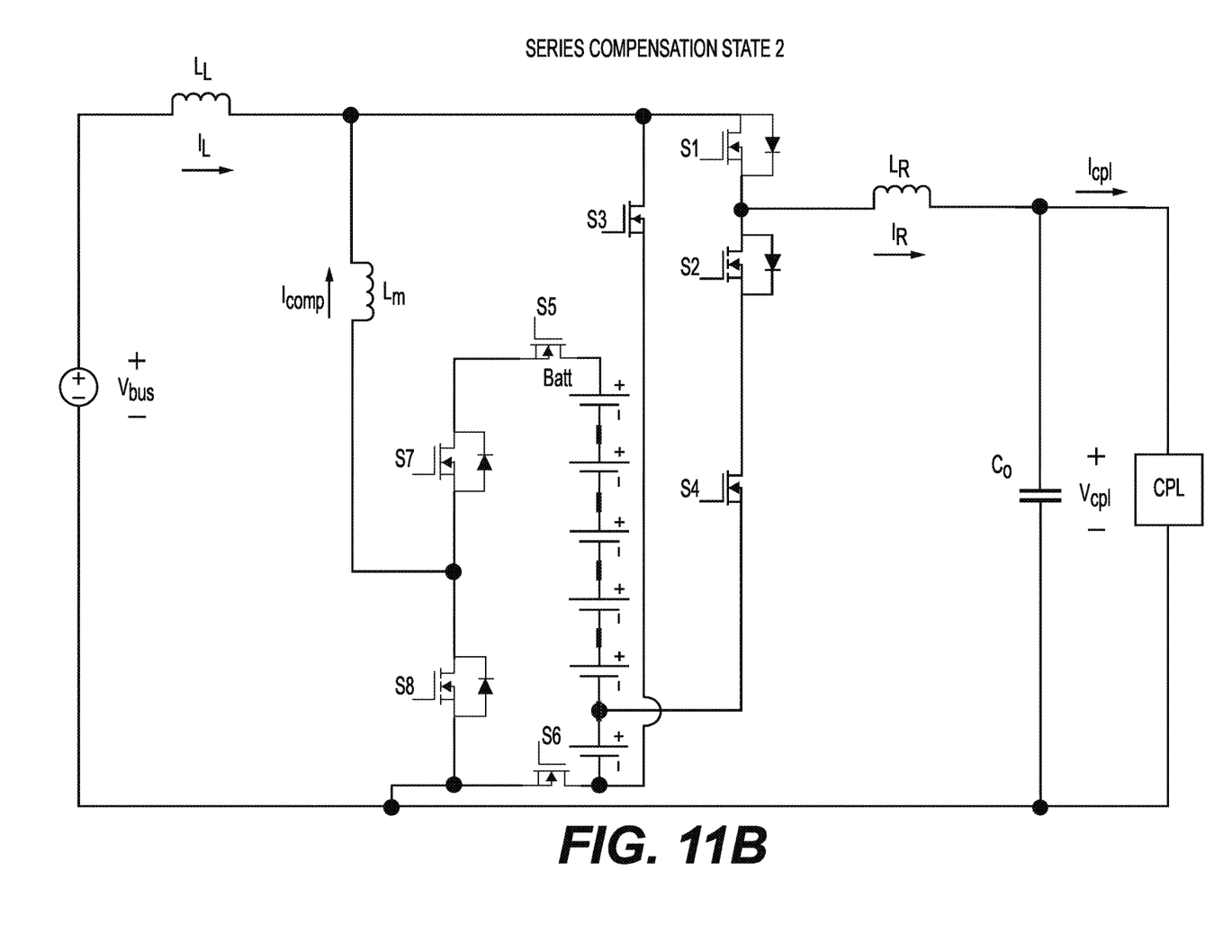

FIGS. 11A and 11B are illustrations of the DC compensation converter of FIG. 10A in series compensation mode. Switches S1 and S3 are turned on in FIG. 11A, and switches S2, S3 and S4 are turned on in FIG. 11B.

Figure 12A:
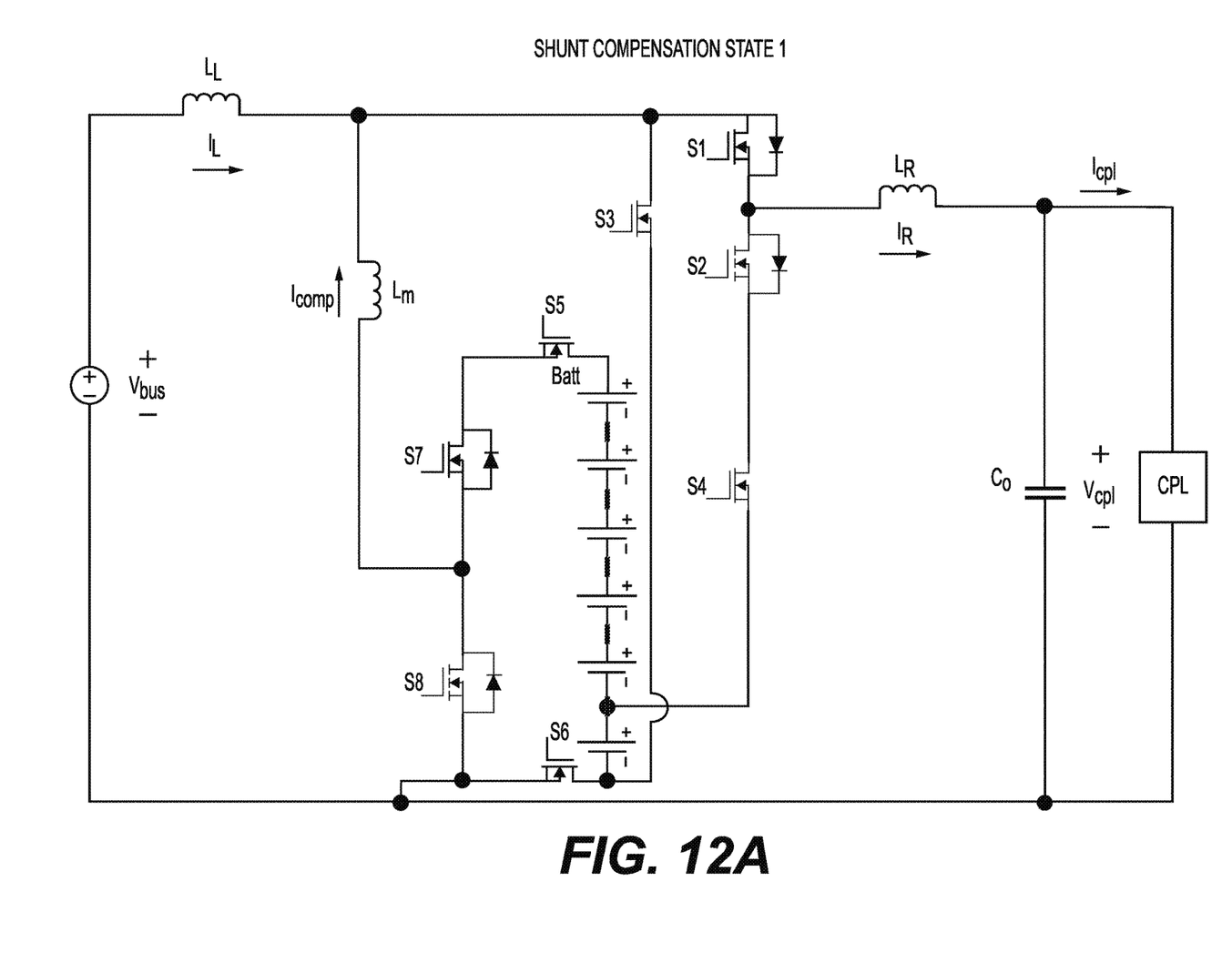
FIGS. 12A and 12B are illustrations of the DC compensation converter of FIG. 10A in shunt compensation mode.
Figure 12B:
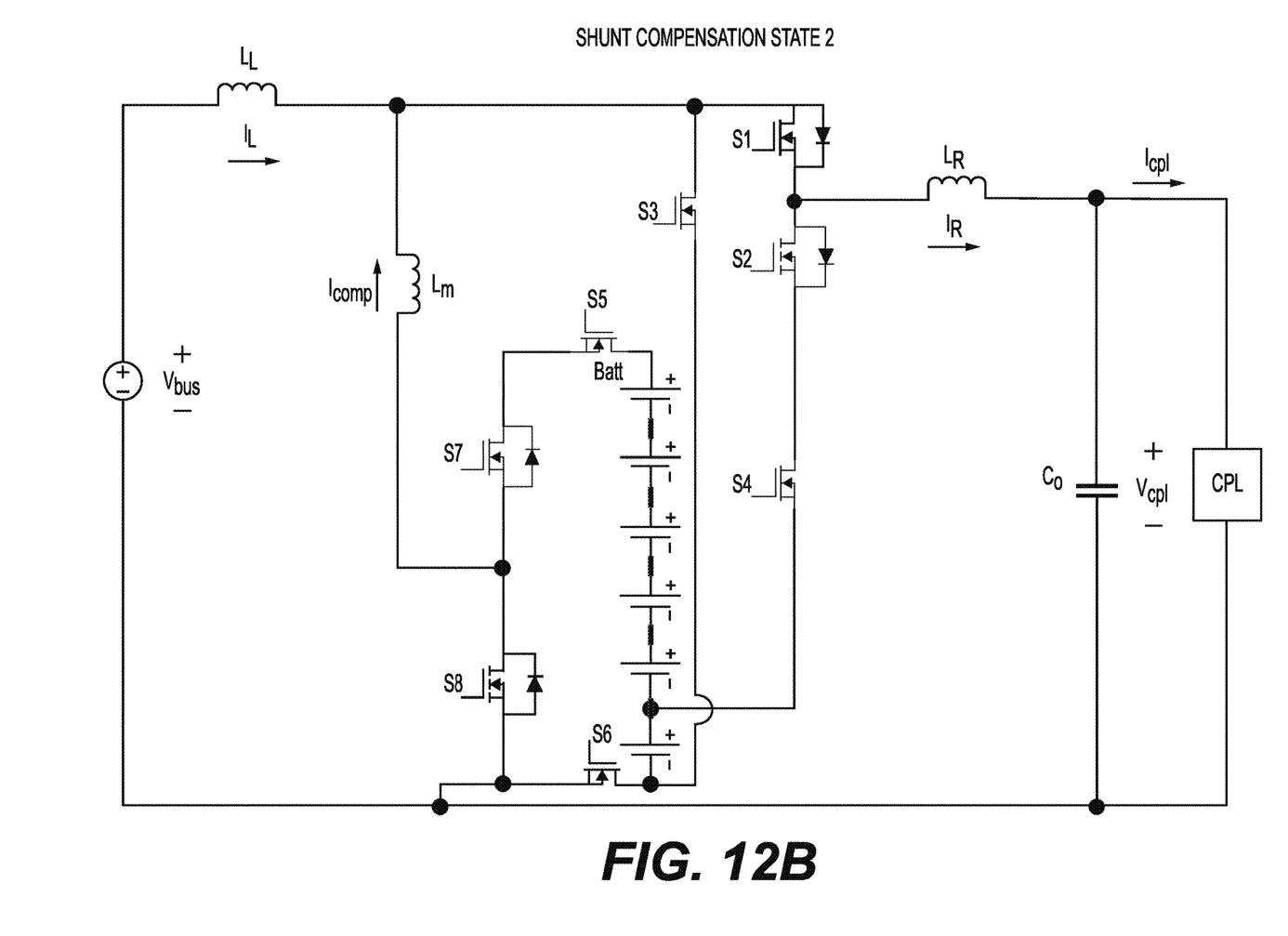

FIGS. 12A and 12B are illustrations of the DC compensation converter of FIG. 10A in shunt compensation mode. Switches S1, S5, S6 and S7 are turned on in FIG. 12A and switches S1, S6 and S8 are turned on in FIG. 12B.

It is to be understood that the system and method for compensating DC grids is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A compensation device for DC grids, comprising:
   a first switch located between a first node and a second node;
   a second switch located between the first node and a third node;
   a voltage source located between the third node and a fourth node;
   a third switch located between the third node and a fifth node;
   a fourth switch located between the fifth node and the fourth node; and
   a fifth switch located between the fourth node and the second node;
   wherein, in normal operation mode, the second switch and third switch are on and the first switch, fourth switch, and fifth switch are off allowing current to flow through the second switch and the third switch.

2. The compensation device for DC grids as recited in claim 1, wherein in series compensation mode, the second switch and fourth switch are on and the first switch, third switch and fifth switch are off allowing current to flow through the second switch, voltage source and the fourth switch.

3. The compensation device for DC grids as recited in claim 1, wherein in parallel compensation mode, the second switch, third switch and fifth switch are on and the first switch and the fourth switch are off allowing current to flow through the second switch, voltage source, third switch and fifth switch.

4. The compensation device for DC grids as recited in claim 1, further comprising:
   a micro gird having a first micro grid connection and a second micro grid connection, the first micro grid connection connected to the first node through a first 3 inductor, and the second micro grid connection connected to the second node; and a constant power load having a first constant power load connection and a second constant power load connection, the first constant power load connection connected to the fifth node through a second inductor and the second constant power load connection connected to the second node.

5. The compensation device for DC grids as recited in claim 1, wherein in series compensation mode, the second switch and fourth switch are on and the first switch, third switch and fifth switch are off allowing current to flow through the second switch, voltage source and the fourth switch; and wherein in parallel compensation mode, the second switch, third switch and fifth switch are on and the first switch and the fourth switch are off allowing current to flow through the second switch, voltage source, third switch and fifth switch.

6. A DC compensation method, in a DC compensation device having a first switch located between a first node and a second node; a second switch located between the first node and a third node; a voltage source located between the third node and a fourth node; a third switch located between the third node and a fifth node; a fourth switch located between the fifth node and the fourth node; and a fifth switch located between the fourth node and the second node, the method comprising:

turning the second switch and the third switch on; and
turning the first switch, fourth switch and fifth switch off;
wherein in this normal operation mode, current is allowed to flow through the second switch and the third switch.

7. The DC compensation method as recited in claim 6 further comprising:

turning the second switch and fourth switch on; and
turning the first switch, third switch and fifth switch off;
wherein in this series compensation mode, current is allowed to flow through the second switch, voltage source and the fourth switch.

8. The DC compensation method as recited in claim 6 further comprising:

turning the second switch, third switch and fifth switch on; and
turning the first switch and the fourth switch off;
wherein in this parallel compensation mode, current is allowed to flow through the second switch, voltage source, third switch and fifth switch.

9. The DC compensation method as recited in claim 6 further comprising:

allowing current to flow through a micro gird having a first micro grid connection and a second micro grid connection, the first micro grid connection connected to the first node through a first inductor, and the second micro grid connection connected to the second node; and allowing current to flow through a constant power load having a first constant power load connection and a second constant power load connection, the first constant power load connection connected to the fifth node through a second inductor, and the second constant power load connection connected to the second node.

* * * * *